United States Patent [19]

Williams, Jr. et al.

[11] 4,034,641
[45] July 12, 1977

[54] SELF-DRILLING AND TAPPING MASONRY ANCHOR

[75] Inventors: Elbert Eugene Williams, Jr., Wooddale; Richard John Ernst, Palatine, both of Ill.

[73] Assignee: Illinois Tool Works Inc., Chicago, Ill.

[21] Appl. No.: 703,989

[22] Filed: July 9, 1976

[51] Int. Cl.² ........................................ F16B 25/00
[52] U.S. Cl. ................................................. 85/41
[58] Field of Search ............... 85/41, 47, 46, 1 P; 408/226, 229, 230, 228, 227; 10/152 T

[56] References Cited

U.S. PATENT DOCUMENTS

| 2,479,730 | 8/1949 | Dewar | 85/47 |
| 2,656,740 | 10/1953 | Bedker | 85/47 X |
| 3,258,797 | 7/1966 | Budd | 85/46 X |
| 3,478,639 | 11/1969 | Gruca | 85/41 |
| 3,524,378 | 8/1970 | Wieber | 85/47 |
| 3,937,119 | 2/1976 | Ernst | 85/47 |

FOREIGN PATENT DOCUMENTS

| 2,354,159 | 5/1974 | Germany | 85/41 |
| 439,636 | 9/1948 | Italy | 85/47 |
| 1,253,544 | 11/1971 | United Kingdom | 85/41 |

*Primary Examiner*—Ramon S. Britts
*Attorney, Agent, or Firm*—Thomas W. Buckman; Robert W. Beart

[57] ABSTRACT

A self-drilling and tapping anchor for use in masonry structures which includes an upper, tapping thread portion and a lower, stabilizing and dust receiving shank portion intermediate the tapping thread and a drill tip. The lower shank has a cross-sectional configuration which defines a maximum and minimum radial dimension with the maximum dimension being greater than or equal to the hole being drilled to axially stabilize and support the fastener as it is drilled into the masonry. The minimum radial dimension and the wall of the hole forming a reservoir into which masonry dust is received during drilling.

7 Claims, 11 Drawing Figures

SELF-DRILLING AND TAPPING MASONRY ANCHOR

BACKGROUND OF THE INVENTION

The present invention relates generally to a masonry anchor and more specifically to a self-drilling anchor for use in hollow wall masonry structures.

Users of prior art devices of this type have been burdened with relatively large in place costs either becuse such devices are multipiece items and/or require multi-step installation procedures.

Typical prior art anchors for masonry applications require at least four separate installation steps, i.e., a step to remove material in the masonry structure, the removal or retraction of the drill or apparatus which is designed to remove the masonry material, the placement of the anchor device in the hole or aperture, and a final step of setting or securing the anchor to the structure.

Prior art masonry anchors are also typically multi-piece devices which incorporate either a bolt with a wedging member or a bolt with a means to expand against and clamp to the blind side of the hollow wall concrete block. Such multi-piece devices, obviously also contribute to a relatively high in place cost due to preassembly, handling, etc.

SUMMARY OF THE INVENTION

In view of the limitations and disadvantages of prior art devices, it is a primary object of this invention to provide a one piece, threaded anchor capable of being inserted into a masonry structure without first preparing an aperture in the structure.

It is a further object of the invention to provide a one piece anchor which can be manufactured easily and efficiently using conventional processes and equipment.

A more specific object of this invention is to provide a masonry anchor which is capable of drilling a hole in a hollow masonry block and anchoring therein in a single operation.

A particular advantage of the present invention is the provision of an anchor capable of drilling a hole in a masonry structure and yet provide an area to which masonry dust may readily accumulate without deleteriously affecting the drilling or anchoring.

All of the above objects and advantages are obtained by the present invention which includes a threaded shank having a drill tip at one end and a driving head at the other end and a lower shank region intermediate the threaded shank and the drill tip. The lower shank region is preferably of a length equal to or greater than the thickness of the masonry wall which is to be drilled and will further be of a cross-sectional configuration including a maximum and minimum radial dimension. The minimum radial dimension provides, in conjunction with the wall of the hole being drilled, a reservoir into which concrete or masonry dust can freely flow. The maximum dimension of the lower shank region advantageously provides continuous support against the walls of the hole being drilled, thus insuring vertical or axial stability for the anchor as it proceeds through the wall. For this reason the maximum radial dimension will be preferably slightly greater than the radial dimension of the drill tip.

It has been found that the use of drill tips directly adjacent to a tapping region of a threaded shank, as in a conventional drill screw, is inadequate and, in fact, inoperative in masonry with a material thickness greater than the length of a drill tip. Since the drill tip is generally very short, such a configuration has little practical use in typical hollow wall masonry block workpieces. In workpieces of a greater thickness than the length of the drill tip, a compound problem prevents such a configuration from being an operable anchor. For example, the proper axial advance and rotational speed required to efficiently drill is frequently quite different than the rotational speed and advancement rate for the tapping to occur in the workpiece. A difference in tapping speed and drilling speed results in either inadequate drilling or a stripping of threads to be formed in the wall of the hole. In addition to this problem, the dust and debris created during the drilling in concrete must be properly exhausted and removed from the drill tip or the drill will be subjected to excessive heat causing a reduction in drilling efficiency. In addition to the heat, the compacted and trapped dust and debris creates a serious increase in friction and subsequent binding of the screw anchor in the hole which could, and in most cases does, result in a shearing of the head from the shank.

Drill screws of the prior art do exist wherein a section of the shank immediately above the drill point is reduced in diameter. Such a configuration, however, in the present environment will lead to the tilting and subsequent breaking or at the very least binding of the shank in the hole prior to complete setting.

The novel features which obtain the objectives and advantages of the invention will become apparent from the following description considered in connection with the accompanying drawings which form part of this specification and of which;

DESCRIPTION OF THE PREFERRED EMBODIMENT

Figure 1:
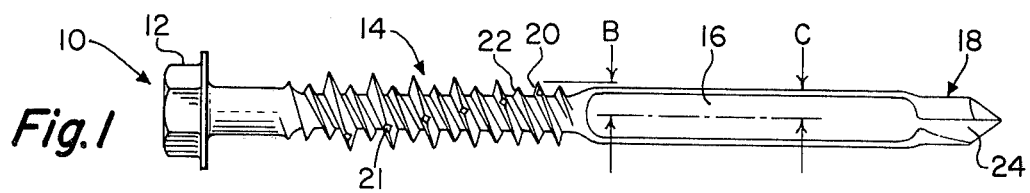
FIG. 1 is a side elevational view of a preferred embodiment of the anchor of the present invention.
Figure 2:
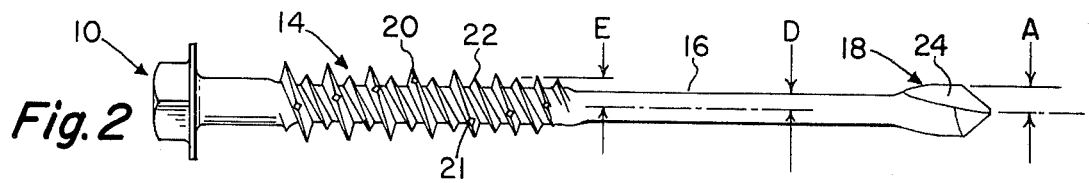
FIG. 2 is a side elevational view of the anchor shown in FIG. 1 taken 90° from the view of FIG. 1.

Turning first to FIGS. 1 and 2, the preferred embodiment of anchor 10 is shown to include a radially enlarged head 12 at one extremity, a threaded, upper shank region 14, a drill tip 18 at the opposite extremity and a lower shank region 16 adjacent to the drill tip and intermediate the drill tip and threaded shank.

The threaded shank region 14, in the preferred embodiment, will include a double lead, spaced thread configuration including a first thread helix 20 of a given height and a second helix 22 of a smaller height than the helix 20. The high thread 20 will preferably taper in crest height from the lower shank region to the head getting progressively greater in height as the helix approaches the head. To facilitate the gradual tapping of mating threads in a concrete hole, notches 21 may be formed in the crest of the high thread.

Figure 5:
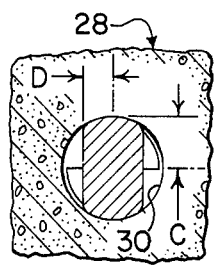
FIG. 5 is a cross-sectional view of the lower shank region of the anchor taken along lines 5—5 of FIG. 3.
Figure 6:
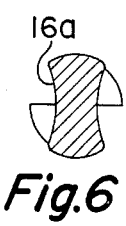
FIGS. 6–10 are various alternate configurations of the cross-section of the lower shank region taken along an area of the lower shank similar to that of 5—5 of FIG. 3.

From FIGS. 1, 2 and 5, it will be shown that the cross-sectional configuration of lower shank region 16 is such as to present a maximum and minimum radial dimension. For purposes to be set forth later herein, the maximum radial dimension should exist at least in two circumferentially spaced positions on the shank. In the preferred embodiment, the maximum radial positions are diametrically opposed with the minimum radial dimensions likewise being diametrically opposed and formed by longitudinally extending, substantially flat portion.

An important aspect of the invention is the relationship between the various radial dimensions of the various portions of the anchor. The drilling tip 18 may be defined as including a first radial dimension A while the crests of the tapping threads 14 may be described as having a second radial dimension B. The lower shank region 16 will have a third radial dimension C and a fourth radial dimension D, respectively, defining the above described maximum and minimum radial dimensions thereof.

Figure 3:
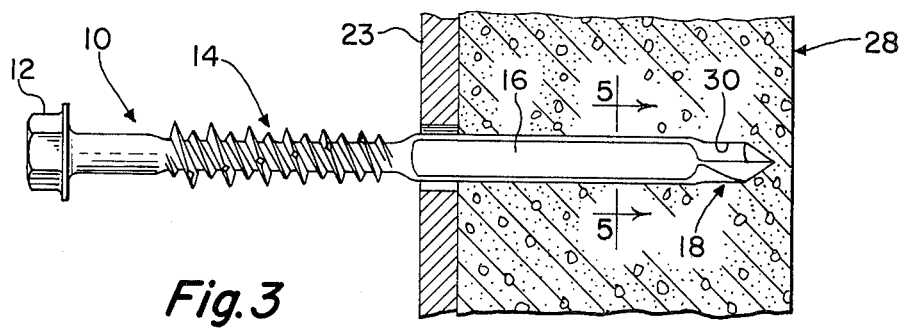
FIGS. 3 and 4 are progressive views, in cross-section, of the use of the anchor during the drilling and setting operation in a masonry block.
Figure 4:
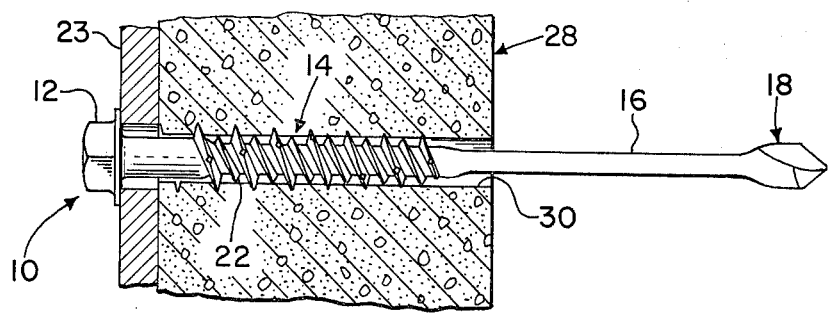

The importance of the relative radial dimensions will be shown with particular reference to FIGS. 3 and 4 showing the anchor in use drilling a hollow wall masonry block 28 and securing a fixture 32 thereto.

The drilling tip 18, effectively produces a hole 30 of a dimension consistent with the first radial dimension A. The third radial dimension C should be equal to or greater than dimension A, but not less than dimension A. The importance of this relationship is displayed in FIG. 3. wherein the enlarged radial dimension c wedges against the wall of hole 30 and thereby vertically stabilizes the anchor as it is drilled through the workpiece. Without such a stabilization and firm support, the anchor would be free to tilt out of axial alignment with the hole causing inefficient drilling, a change in the path of drilling and creating stress on the anchor. In practice, the dimension C is preferably slightly greater than dimension A so that the hole may be accurately sized and, in fact, burnished, preparing it for the eventual tapping and embedment of the crests of the tapping threads 20 into the wall. Such sizing and supporting features become especially important in a structure such as masonry, concrete, brick, etc., since the presence of aggregate, sand and concrete often presents a substance not uniform in hardness or consistency. The drilling of this type of structure produces a hole with voids or soft spots on one side and aggregate on opposite sides of the hole. It is further advisable that the maximum radial dimension surface be located at a plurality of circumferentially spaced locations on the lower shank region to balance the forces and more adequately support the anchor during drilling. The sizing and burnishing accomplished by the lower shank region 16 creates a more uniform wall surface into which threads are tapped.

During the drilling operation, the reduced transverse radial dimension D produces a reservoir between the side wall of hole 30 and the lower shank region. Since the length of the lower shank region is preferably at least equal to the thickness of the workpiece, such reservoir or reservoirs provide adequate space into which dust, debris, etc., may flow away from the point. With the length of the lower shank region being at least equal to the thickness of the workpiece, the tapping of threads is not impeded.

The radial dimension B which is defined by the crest of the tapping thread must be greater than the radial dimension C so that the threaded shank 14 may properly embed in the wall of the hole in the workpiece.

Still a further radial dimension that must be considered in the preferred embodiment shown is dimension E which defines the crest diameter of the lowermost thread 22. Radial dimension E, thus defined, should be substantially equal to or even slightly greater than the radial dimension C, thereby allowing this intermediate low thread 22 to function as an additional axial stabilizing means as the threaded shank is tapped into the hole. The spaces between adjacent threads 20 and 22 serve as a secondary reservoir to receive any unaccommodated dust or dust that is created during the tapping operation.

While the drill tip 18 may be of any recognized configuration, the preferred embodiment shows a drill tip including a pair of flutes 24 further accommodating dust removal. The preferred embodiment also shows the flutes 24 aligned with and directly interconnected to the surfaces defining the minimum radial dimension to provide an unimpeded path for the dust. Forging technology may be used to facilitate the manufacture of this anchor. Both the drill tip 18 and lower shank region 16 can be simultaneously formed using such technology.

Figure 7:
Figure 8:
Figure 9:
Figure 10:

FIGS. 6–10 show various alternative configurations for the cross section of the lower shank region 16. It will be apparent that each of the alternate cross-sectional configurations will include a maximum and minimum radial dimension similar to dimensions C and D described above. Each of these embodiments includes at least two longitudinally extending surfaces lying on the maximum radial dimension so as to support the anchor on two circumferentially spaced regions in the hole. FIGS. 7 and 8 show lower shank regions 16b and 16c where an odd number of longitudinally extending surfaces are formed providing a balanced support about the hole. FIGS. 6, 8, 9 and 10 show longitudinally extending surfaces on shank regions 16a, 16c, 16d and 16e which, associated with the maximum radial dimension, are generally arcuate to create a burnishing of the hole.

Figure 11:
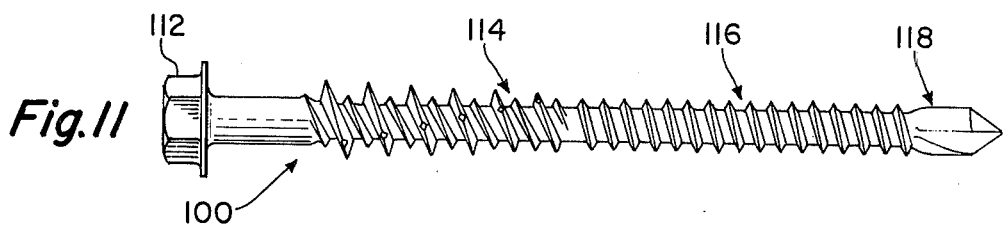
FIG. 11 is a side elevational view of a further embodiment of the anchor.

In addition to the use of substantially constant cross-sectional configurations presenting longitudinally extending maximum and minimum radial dimensions, the objects and advantages of the invention can be obtained through the use of a helical impression formed on the lower shank. For example, the anchor 100 shown in FIG. 11 includes such a helix 116 wherein the crest thereof has a radial dimension similar to the maximum radial dimension C, as in the preferred embodiment, and a root dimension which represents the minimum radial dimension D, in the preferred embodiment. In this alternate embodiment, the helix serves to size the hole as well as stabilize the anchor as it is inserted in the workpiece. The relationship of the radial dimensions of lower shank 116, tip 118 and the crest of thread 114 remains similar to the respective relationships of tip 18, thread 14 and shank 16 of the preferred embodiment. In addition, the helical shape of the stabilizing section serves to positively displace the dust by a pumping action within the root between the crests of the threads 116.

Although the invention has been described and illustrated with a degree of particularity, it is understood that the disclosure is made only by way of example and that numerous variations and departures from the disclosure can be made without departing from the spirit and scope of the invention as hereinafter claimed.

We claim:

1. In combination with a masonry work structure of predetermined thickness, a self-drilling and tapping masonry anchor comprising an elongate shank body with a drilling tip at one extremity and a radially enlarged driving head at the opposite extremity, the drilling tip including cutting edges defining a first predetermined radial dimension, the shank body including an upper region with a tapping and holding thread formed thereon having a predetermined crest diameter, said thread having an axially spaced root region with a maximum crest diameter which increases gradually from the lowermost region to the uppermost region with the lowermost region defining said predetermined crest diameter, the predetermined crest diameter of said thread thereby defining a second predetermined radial dimension, a lower shank body region forming axial stabilizing and material receiving means directly adjacent the drill tip with a cross-sectional configuration that includes third and fourth predetermined radial dimensions, respectively, defining maximum and minimum radial dimension on said lower shank region, the third, maximum, radial dimension on the lower shank region being defined by a plurality of circumferentially spaced longitudinally extending surfaces, the second predetermined radial dimension being greater than the first predetermined radial dimension thereby permitting at least the crests of the tapping and holding thread to be imbedded in the walls of the hole formed by the drill point, the third predetermined radial dimension being greater than the first predetermined radial dimension and less than the second predetermined radial dimension of the threads so that said lower body accurately sizes the hole and axially stabilizes the anchor during drilling while providing an area between the walls of the hole and the fourth, minimum, radial dimension of the lower shank region into which masonry dust can flow and accumulate, the drilling tip having an axial extent substantially less than the predetermined thickness of the workpiece, the lower shank body having a length substantially equal to said predetermined thickness.

2. The self-drilling and tapping masonry anchor of claim 1, wherein the lower shank region is reduced in transverse dimension substantially uniformly along the longitudinal extent thereof.

3. The self-drilling and tapping masonry anchor of claim 1, wherein the lower shank body is configured to include opposing substantially flat surfaces extending longitudinally from the drill tip to the threaded shank.

4. The self-drilling and tapping masonry anchor of claim 1, wherein the lower shank surfaces defining said maximum radial dimensions thereof are arcuate.

5. The self-drilling and tapping masonry anchor of claim 2, wherein the drill tip includes a pair of generally longitudinal flutes generally aligned with and directly interconnected with the opposed surfaces forming the minimum transverse dimension to facilitate flow of masonry removed from the cutting edges to the reservoir formed by and between the said opposing surfaces and the wall of the hole.

6. The self-drilling and tapping masonry anchor of claim 1, wherein the drill tip is forged thereon.

7. The self-drilling and tapping masonry anchor of claim 1, wherein the threaded shank includes a first helical thread having a plurality of convolutions and relatively large predetermined height so as to define said first predetermined radial dimension, a second helical thread having a plurality of convolutions and predetermined height less than the height of the first thread so as to define a radial dimension substantially equal to the third predetermined radial dimension of the lower shank region.

* * * * *